(12) United States Patent
Lin et al.

(10) Patent No.: US 12,085,834 B2
(45) Date of Patent: Sep. 10, 2024

(54) ELECTRICALLY TUNABLE LIQUID CRYSTAL LENS AND COMPOSITE ELECTRICALLY TUNABLE LIQUID CRYSTAL LENS INCLUDING THE SAME

(71) Applicant: National Yang Ming Chiao Tung University, Hsinchu (TW)

(72) Inventors: Yi-Hsin Lin, Zhubei (TW); Ting-Wei Huang, Shuishang Township (TW); Wei-Cheng Cheng, Zhudong Township (TW); Chang-Nien Mao, New Taipei (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 5 days.

(21) Appl. No.: 18/333,160

(22) Filed: Jun. 12, 2023

(65) Prior Publication Data
US 2024/0176205 A1    May 30, 2024

(30) Foreign Application Priority Data

Nov. 29, 2022 (TW) .................................. 111145684

(51) Int. Cl.
*G02F 1/29*    (2006.01)
(52) U.S. Cl.
CPC .......... *G02F 1/294* (2021.01); *G02F 2203/06* (2013.01)
(58) Field of Classification Search
CPC .................................. G02F 1/29; G02F 1/294
USPC ....................................................... 349/200
See application file for complete search history.

(56) References Cited

U.S. PATENT DOCUMENTS

| | | | | |
|---|---|---|---|---|
| 10,802,374 | B1* | 10/2020 | Wang | G02F 1/29 |
| 2012/0075569 | A1* | 3/2012 | Chang | G02F 1/29 |
| | | | | 349/200 |
| 2015/0015839 | A1 | 1/2015 | Chin et al. | |
| 2016/0000557 | A1* | 1/2016 | Galstian | A61F 2/16 |
| | | | | 623/6.22 |
| 2017/0277012 | A1* | 9/2017 | Huh | G02F 1/1333 |

OTHER PUBLICATIONS

Y. Wang et al., "Electrically tunable gradient-index lenses via nematic liquid crystals with a method of spatially extended phase distribution," Optics Express, 27(22), pp. 32398-32408, 2019.

* cited by examiner

*Primary Examiner* — Dung T Nguyen
*Assistant Examiner* — David Y Chung
(74) *Attorney, Agent, or Firm* — Brooks Kushman P.C.

(57) ABSTRACT

An electrically tunable liquid crystal lens includes a carrier substrate, a common electrode layer disposed on the carrier substrate, a liquid crystal unit, a patterned electrode layer, a terminal electrode layer, a dielectric insulating layer, and a cover. The liquid crystal unit is disposed on the common electrode layer opposite to the carrier substrate, and includes a plurality of liquid crystal molecules. The patterned electrode layer is disposed on the liquid crystal unit opposite to the common electrode layer, and has a plurality of aperture patterns located within a projection of the liquid crystal unit on the patterned electrode layer. The terminal electrode layer is disposed on the patterned electrode layer opposite to the liquid crystal unit. The dielectric insulating layer is disposed between the patterned electrode layer and the terminal electrode layer. The cover is disposed on the terminal electrode layer opposite to the dielectric insulating layer.

12 Claims, 11 Drawing Sheets

ELECTRICALLY TUNABLE LIQUID CRYSTAL LENS AND COMPOSITE ELECTRICALLY TUNABLE LIQUID CRYSTAL LENS INCLUDING THE SAME

CROSS-REFERENCE TO RELATED APPLICATION

This application claims priority to Taiwanese Invention Patent Application No. 111145684, filed on Nov. 29, 2022.

FIELD

The disclosure relates to an optical element, and more particularly to an electrically tunable liquid crystal lens.

BACKGROUND

A liquid crystal lens element is considered as a variable focus lens element, and generally includes a liquid crystal unit, a pair of alignment membranes respectively disposed on two opposite surfaces of the liquid crystal unit, and a pair of electrode layers respectively disposed on the alignment membranes opposite to the liquid crystal unit. The liquid crystal lens element utilizes the electrode layers to electrically drive and control orientation of liquid crystal molecules present in the liquid crystal unit, so as to alter a focal length of the liquid crystal lens element, and thus a diopter of the liquid crystal lens element. Change of orientation of liquid crystal molecules differs in accordance with configuration of the electrode layers. For example, U.S. Invention Patent Application Publication No. US 20150015839 A1 discloses a liquid crystal lens including a liquid crystal layer and two driving electrode plates disposed on two sides of the liquid crystal layer. One of the driving electrode plates includes at least two ring-shaped electrodes, and one of the ring-shaped electrodes surrounds the remaining one of the ring-shaped electrodes. When a voltage is applied to the driving electrode plates, the liquid crystal molecules of liquid crystal layer present therebetween are subjected to an electric field, and are thus induced to rotate. Since one of the driving electrode plates has ring-shaped electrodes, the liquid crystal molecules rotate in accordance with the ring-shaped pattern of the electrodes, causing change of refractive index of the liquid crystal layer, so as to achieve the effect similar to that of a convex lens or a concave lens.

That is, an area of the liquid crystal lens element that could have the diopter thereof adjustable is determined based on the size of aperture pattern of the electrode layers (e.g., the ring-shaped electrodes of the aforementioned U.S. Invention Patent Application Publication No. US 20150015839 A1). When the liquid crystal lens is used as lens of a vision correction eyeglasses for users with different eyesight conditions, in order to make field of vision of the users position within the area of the liquid crystal lens element that could have the diopter of the liquid crystal lens element adjustable, the aperture pattern of the electrode layers is usually preferably large to facilitate control over a large area of the liquid crystal molecules. However, given that a thickness of the liquid crystal lens element is fixed, a larger size of aperture pattern of the electrode layers results in a smaller diopter of the liquid crystal lens element, and thus limits the use of such liquid crystal lens element.

SUMMARY

Therefore, an object of the disclosure is to provide an electrically tunable liquid crystal lens that can alleviate at least one of the drawbacks of the prior art. For example, the electrically tunable liquid crystal lens may be a liquid crystal lens that can adjust diopter thereof over a large area, in which the diopter can be adjusted to a larger value. Another object of this disclosure is to provide a composite electrically tunable liquid crystal lens including the aforementioned electrically tunable liquid crystal lens.

In a first aspect of the disclosure, the electrically tunable liquid crystal lens includes a carrier substrate that is light-transmissible, a common electrode layer disposed on the carrier substrate, a liquid crystal unit, a patterned electrode layer, a terminal electrode layer, a dielectric insulating layer and a cover. The liquid crystal unit is disposed on the common electrode layer opposite to the carrier substrate, and includes a plurality of liquid crystal molecules. The patterned electrode layer is disposed on the liquid crystal unit opposite to the common electrode layer, and has a plurality of aperture patterns which are located within a projection of the liquid crystal unit on the patterned electrode layer. The terminal electrode layer is disposed on the patterned electrode layer opposite to the liquid crystal unit. The dielectric insulating layer is disposed between the patterned electrode layer and the terminal electrode layer to electrically isolate the patterned electrode layer and the terminal electrode layer from each other. The cover is disposed on the terminal electrode layer opposite to the dielectric insulating layer and is light-transmissible.

In a second aspect of the disclosure, the composite electrically tunable liquid crystal lens includes two aforementioned electrically tunable liquid crystal lenses that are connected to each other in a manner that one of the cover and the carrier substrate of a first one of the electrically tunable liquid crystal lenses faces one of the cover and the carrier substrate of a second one of the electrically tunable liquid crystal lenses. Each of the aperture patterns of the first one of the electrically tunable liquid crystal lenses corresponds to a respective one of the aperture patterns of the second one of the electrically tunable liquid crystal lenses in position to share the same geometric center.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
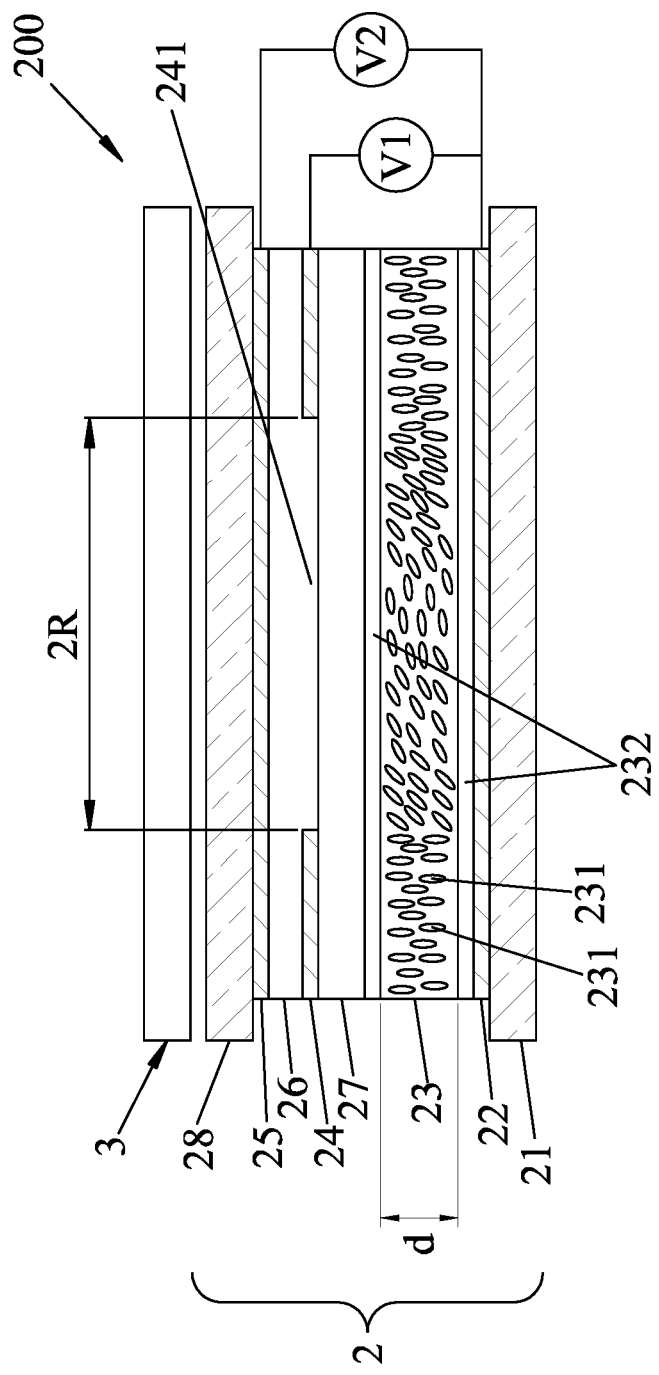
FIG. 1 is a schematic cross-sectional view illustrating an embodiment of an electrically tunable liquid crystal lens according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIG. 1, an embodiment of an electrically tunable liquid crystal lens 200 of the present disclosure may be adopted as a lens of an eyewear (not shown) by a user. The electrically tunable liquid crystal lens 200 includes an electrically tunable liquid crystal lens structure 2, which includes a carrier substrate 21, a common electrode 22 disposed on the carrier substrate 21, a liquid crystal unit 23 disposed on the common electrode 22 opposite to the carrier substrate 21, a patterned electrode layer 24 disposed on the liquid crystal unit 23 opposite to the common electrode 22, a terminal electrode layer 25 disposed on the patterned electrode layer 24 opposite to the liquid crystal unit 23, a dielectric insulating layer 26 disposed between the patterned electrode layer 24 and the terminal electrode layer 25, a resistance layer 27 disposed between the liquid crystal unit 23 and the patterned electrode layer 24, and a cover 28 disposed on the terminal electrode layer 25 opposite to the dielectric insulating layer 26.

The carrier substrate 21 is light-transmissible, and may be selected from a glass material (for instance, BK7, H-K9L), or a plastic material (for instance, polycarbonate (PC), poly(methyl methacrylate) (PMMA), cyclo olefin polymer (COP, e.g., Zeonex® E48R COP, Zeonex® T62R COP). The common electrode 22 is disposed on the carrier substrate 21, and is made of a transparent electrically conducting membrane. The liquid crystal unit 23 is disposed on the common electrode 22 opposite to the carrier substrate 21. The liquid crystal unit 23 includes a plurality of liquid crystal molecules 231, and two alignment membranes 232 that are disposed separately from each other and that sandwich the liquid crystal molecules 23. One of the alignment membranes 232 is disposed between the common electrode layer 22 and the liquid crystal molecules 231, and the other one of the alignment membranes 232 is disposed on the liquid crystal molecules 231 opposite to the common electrode layer 22. In this exemplary embodiment, the alignment membranes 232 are made of a material selected from polyimide (PI).

The patterned electrode layer 24 is made of a transparent electrically conducting membrane, and has a plurality of aperture patterns 241 that are located within a projection of the liquid crystal unit 23 on the patterned electrode layer 24. In some embodiments, the aperture patterns 241 may have a size ranging from about 1 mm to about 30 mm. In other embodiments, depending on practical requirements of the diopter, the size of aperture patterns 241 may be less than about 1 mm, or greater than about 30 mm. In FIG. 1, only one of the aperture patterns 241 of the electrically tunable liquid crystal lens 200 is shown, but in practice, there are a plurality of the aperture patterns 241.

The patterned electrode layer 24 is electrically connected to an external electrical component, and cooperates with the common electrode layer 22 to build up a first electric field (V1) to the liquid crystal unit 23.

Figure 2A:
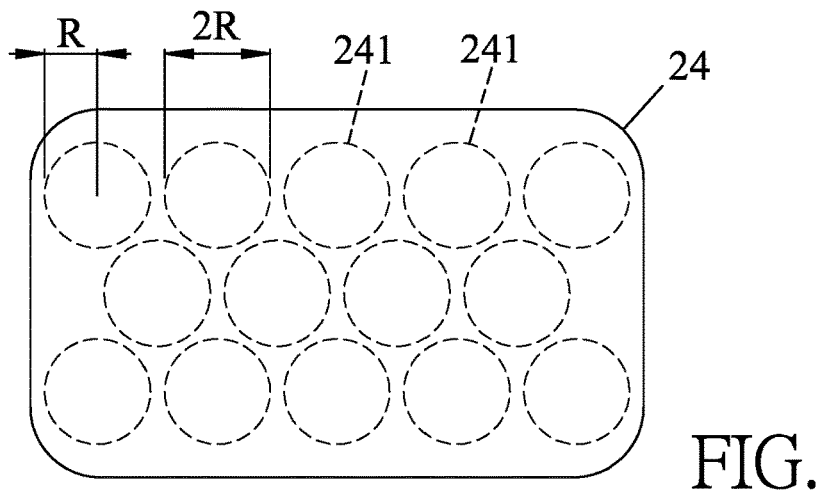
FIGS. 2A to 3C are schematic top views respectively illustrating variations of a patterned electrode layer of the electrically tunable liquid crystal lens according to the present disclosure.
Figure 2B:
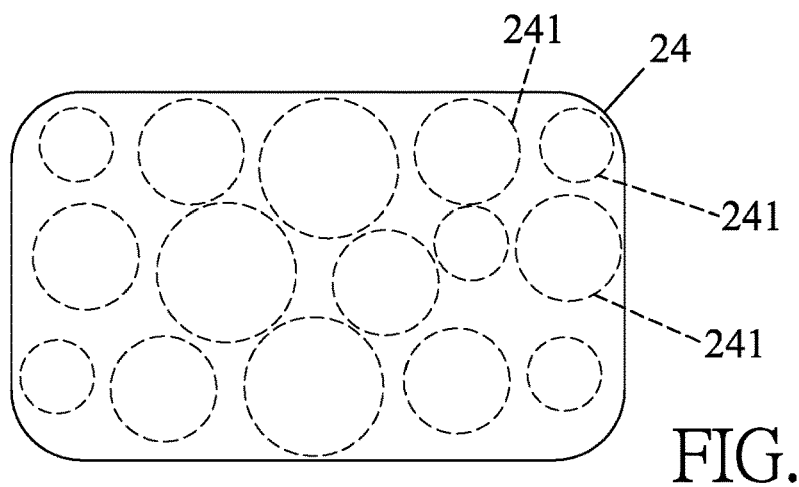
Figure 2C:
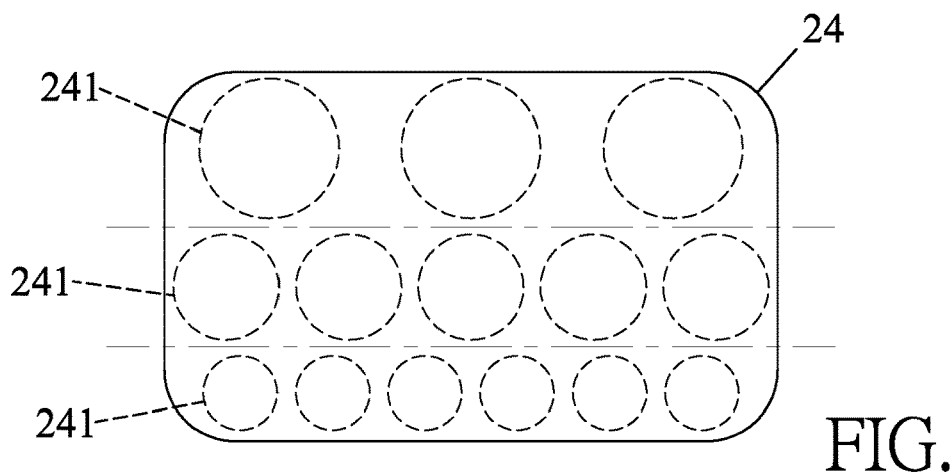

Referring to FIGS. 2A to 2C, based on different design requirements, the aperture patterns 241 may have the same, or different configurations in terms of shapes, sizes, and distributions thereof. That is, the aperture patterns 241 may be formed with sizes independent from each other. For instance, the aperture patterns 241 may be arranged in a regular manner as shown in FIG. 2A, or may be arranged in an irregular manner as shown in FIG. 2B. In addition, the aperture patterns 241 may be formed with a plurality of sizes, and may be irregularly arranged (see FIG. 2B), or may be regularly arranged along a predetermined direction based on the sizes of the aperture patterns 241 so that sizes of the aperture patterns 241 vary in a stepwise manner. Exemplarily, as shown in FIG. 2C, the aperture patterns 241 are formed with three different sizes, and the aperture patterns 241 having the same sizes are arranged into the same row, i.e., there are three rows of the aperture patterns 241. The three rows are arranged in a manner of gradual change in size of the aperture patterns 241.

Figure 3A:
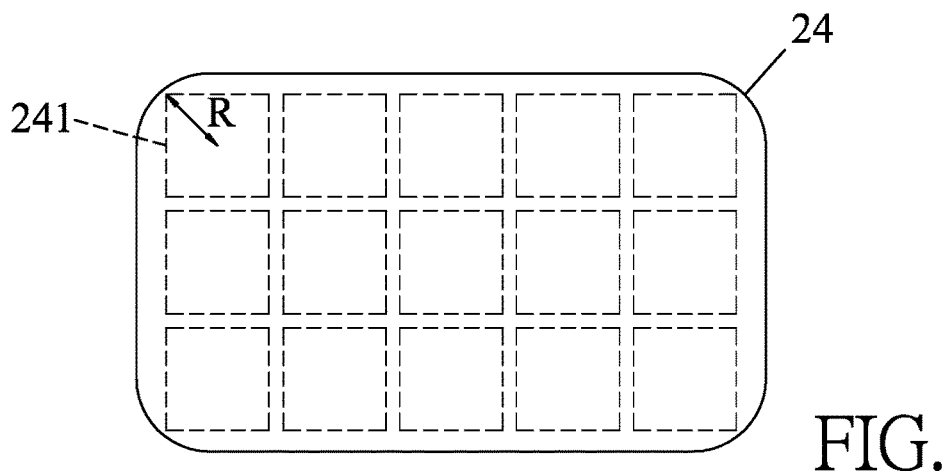
Figure 3B:
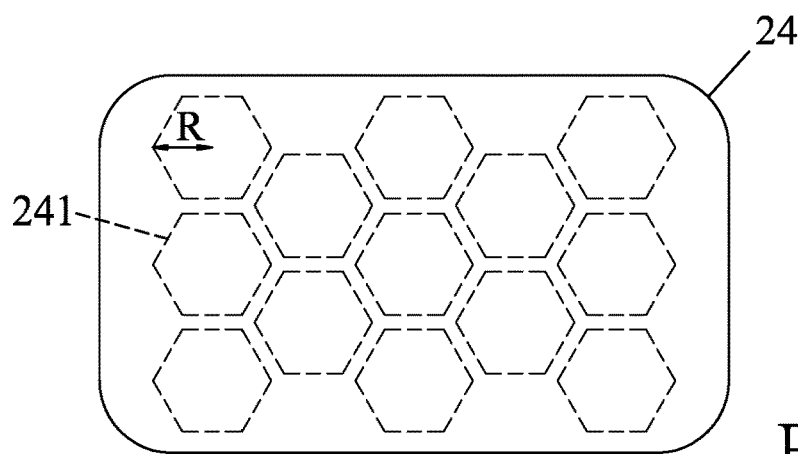
Figure 3C:
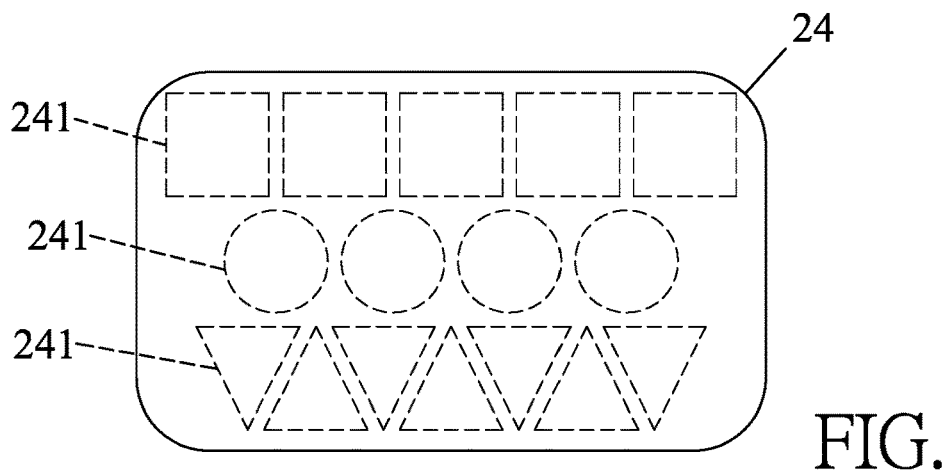

Referring to FIGS. 3A to 3C, the aperture patterns 241 may be formed with shapes independent from each other. As shown in FIGS. 2A to 2C, in some embodiments, the aperture patterns 241 are each formed with a circle shape. In other embodiments, the aperture patterns 241 are each formed with a square shape (see FIG. 3A), a polygonal shape (see FIG. 3B), or a ring shape (see FIG. 10). In addition, as shown in FIG. 3C, the patterned electrode layer 24 may also have the aperture patterns 241 that are formed with a plurality of shapes, in which the shapes are not limited to the aforementioned examples. In certain embodiments, the aperture patterns 241 are regularly arranged in a most compact manner, so as to be maximally distributed throughout and to correspond in position to the entire lens area of the electrically tunable liquid crystal lens 200.

Referring back to FIG. 1, the terminal electrode layer 25 is disposed separately from the patterned electrode layer 24. The terminal electrode layer 25 is made of a transparent electrically conducting membrane, is electrically connected to an external electrical component, and cooperates with the common electrode layer 22 to build up a second electric field (V2) to the liquid crystal unit 23. The first and second electric fields (V1 and V2) together form a predetermined variable electric field to the liquid crystal unit 23. Within the liquid crystal unit 23, orientation of the liquid crystal molecules 231 changes in accordance with the direction of the predetermined variable electric field, such that refractive index of the liquid crystal unit 23 is also changed, and regions of the liquid crystal unit 23 in positions corresponding to the aperture patterns 241 are each arranged to have a diopter.

Specifically, the first and second electric field (V1, V2), in cooperation with a resistance layer 27 (which assists distribution of electric field to the aperture patterns 241, and which will be discussed later), form the predetermined variable electric field having a gradually variable electric field strength across each of the regions of the liquid crystal unit 23. When the regions of the liquid crystal unit 23 are each subjected to such predetermined variable electric field, along a direction from a position corresponding to central of a respective one of the aperture patterns 241 to a position corresponding to a periphery of the respective one of the aperture patterns 241, tilt angles of the liquid crystal molecules 231 in each of the regions of the liquid crystal unit 23 are gradually changed, causing a gradual change of refractive index in each of the regions of the liquid crystal unit 23, and each of the regions of the liquid crystal unit 23 is arranged to have a diopter. When a light is incident on the liquid crystal unit 23, the regions of the liquid crystal unit 23 are each independently arranged to have a diopter, and thus throughout the liquid crystal unit 23, a refractive index, and accordingly a diopter thereof, may be variable. That is, a light incident on different regions of the liquid crystal unit 23 may have different degree of divergence or convergence in accordance with a respective diopter.

The diopter (P) for each of the regions of the liquid crystal unit 23 (corresponding in position to the respective aperture pattern 241) is calculated based on the following equation:

$$P = \frac{2 \times N \times d}{R^2}$$

in which N is difference in refractive index of the liquid crystal unit 23 due to birefringence; d is thickness of the liquid crystal unit 23 (see FIG. 1); and R is a radius of the respective aperture pattern 241, or is a longest straight-line distance measured from a geometric center to a periphery of the respective aperture pattern 241 when the respective aperture pattern 241 is in a shape other than a circle. In the case that the thickness (d) of the liquid crystal unit 23 is fixed, when the respective aperture pattern 241 has a smaller size, the respective region of the liquid crystal unit 23 is capable of being arranged to have a greater diopter (P). In certain embodiments, the aperture patterns 241 are each formed into a circle shape, a ring shape, or a combination thereof. When the liquid crystal molecules 231 in each of the regions of the liquid crystal unit 23 are subjected to the predetermined variable electric field, the regions of the liquid crystal unit 23 may have the same or different diopters in accordance with the design of the aperture patterns 241. In other cases, each of the regions of the liquid crystal unit 23 subjected to different electric fields may also have different diopters. By varying design of the aperture patterns 241, the liquid crystal unit 23 may have a liquid crystal lens structure similar to a gradient-index (GRIN) lens, a Fresnel lens, or a combination thereof.

That is, the electrically tunable liquid crystal lens 200 may be considered as a variable focal length element, and by electrically tuning and changing orientation of the crystal liquid molecules 231, diopter of each of the regions of the liquid crystal unit 23 may be adjusted.

In some embodiments, based on different practical requirements, by merely applying the first electric field (V1) on each of the regions of the liquid crystal unit 23, the orientation of the liquid crystal molecules 231 may be similarly changed based on the shapes and distributions of the aperture patterns 241.

The dielectric insulating layer 26 may be made of an insulating material, and may be disposed between the patterned electrode layer 24 and the terminal electrode layer 25, so as to electrically isolate the patterned electrode layer 24 and the terminal electrode layer 25 from each other. In this exemplary embodiment, the dielectric insulating layer 26 is an optical adhesive (such as Norland Optical Adhesive 81 (NOA81)).

The resistance layer 27 may be disposed on one of a first position between the liquid crystal unit 23 and the patterned electrode layer 24, and a second position between the dielectric insulating layer 26 and the patterned electrode layer 24. The resistance layer 27 may include an electrically conductive polymer. In some embodiments, the resistance layer 27 may have a resistivity greater than that of the patterned electrode layer 24 and lower than that of the dielectric insulating layer 26. Therefore, when the first electric field (V1) and/or the second electric field (V2) are built, the resistance layer 27 assists distribution of electric field to a geometric center of each of the aperture patterns 241, not only around periphery of the patterned electrode layer 24. It is noted that resistivity of the resistance layer 27 varies in accordance with level and frequency of the voltage. In this exemplary embodiment, the resistance layer 27 is disposed in the first position (i.e., between the liquid crystal unit 23 and the patterned electrode layer 24). The resistance layer 27 may include a polyvinyl alcohol (PVA), and the electrically conductive polymer.

The cover 28 may be disposed on the terminal electrode layer 25 opposite to the dielectric insulating layer 26, and may be light-transmissible. The cover 28 may be selected from one of a glass material (such as BK7 or H-K9L), and a plastic material (such as polycarbonate (PC), poly(methyl methacrylate) (PMMA), E48R or T62R). The cover 28 and the carrier substrate 21 cooperate with each other to sandwich and protect the liquid crystal unit 23, thereby forming a lens that is suitable to be worn by a user.

The electrically tunable liquid crystal lens 200 may further include a polarizer 3 disposed outboard of one of the cover 28 and the carrier substrate 21 of the electrically tunable liquid crystal lens structure 2. The polarizer 3 may convert a light that is incident on or leaves the electrically tunable liquid crystal lens structure 2 into a polarized light with a predetermined polarization orientation. In this exemplary embodiment, the polarizer 3 is disposed outboard of the cover 28.

In certain embodiments, when a light source incident on the electrically tunable liquid crystal lens structure 2 is linearly polarized along an incident plane (a plane formed between incident light propagation direction and an optical axis of the electrically tunable liquid crystal lens 200) the polarizer 3 may be omitted.

In a conventional liquid crystal lens element, only one aperture pattern is present in an electrode layer to change orientation of liquid crystal molecules. Therefore, in order to allow an entire lens area of the conventional liquid crystal lens element to have an adjustable diopter, the only one aperture pattern is usually designed to be as large as possible, causing the diopter of such conventional liquid crystal lens element becomes small, and the adjustable range of the diopter is limited. In the present disclosure, the patterned electrode layer 24 of the electrically tunable liquid crystal lens 200 has a plurality of aperture patterns 241 that are in relatively small sizes, such that regions of the liquid crystal unit 23 corresponding to such relatively small sizes aperture patterns 241 may each be arranged to have a relatively large diopter. Moreover, the aperture patterns 241 are distributed corresponding to an entire lens area of the electrically tunable liquid crystal lens 200, so that the entire lens area may have an adjustable diopter. Thus, when the electrically tunable liquid crystal lens 200 is configured as a lens worn by a user, field of vision of the user falls into the lens area of the electrically tunable liquid crystal lens 200 that has the diopter adjustable. In addition, considering that the thickness of the lens (more specifically, the thickness of the liquid crystal unit 23) is fixed, such electrically tunable liquid crystal lens 200 may have a relatively larger diopter.

Orientation of the predetermined variable electric field varies in accordance with distribution and/or sizes of the aperture patterns 241, which in turn causes change of refractive index of each of the regions of the liquid crystal unit 23. Thus, the regions of the liquid crystal unit 23 in positions corresponding to the aperture patterns 241 are each arranged to have a diopter. Moreover, based on practical requirements, in operation of the electrically tunable liquid crystal lens 200, all, or a portion of the aperture patterns 241 may be electrically driven, so as to electrically control and change orientation of the liquid crystal molecules 231 of the entire, or a portion of the liquid crystal unit 23, accordingly.

In some embodiments, the electrically tunable liquid crystal lens 200 may further include an eyeball tracking system (not shown). The lens area of the electrically tunable liquid crystal lens 200 may be divided into different parts, which are each in position corresponding to a respective part of the aperture patterns 241 and which receives signals from the eyeball tracking system, so as to electrically control and change diopter of part(s) of the lens area of the electrically tunable liquid crystal lens 200 (such as the lens area reached by field of vision of the user).

In some embodiments, based on product design requirement, the electrically tunable liquid crystal lens 200 electrically controls and changes orientation of a portion of the liquid crystal molecules 231 of the crystal liquid unit 23. That is, by applying different voltages to build up the first and/or second electric fields (V1, V2), in cooperation with the aperture patterns 241, the electrically tunable liquid crystal lens 200 may exhibit different diopters at different regions thereof, so that the electrically tunable liquid crystal lens 200 can be a multifocal lens, a progressive lens, or a progressive lens.

Figure 4:
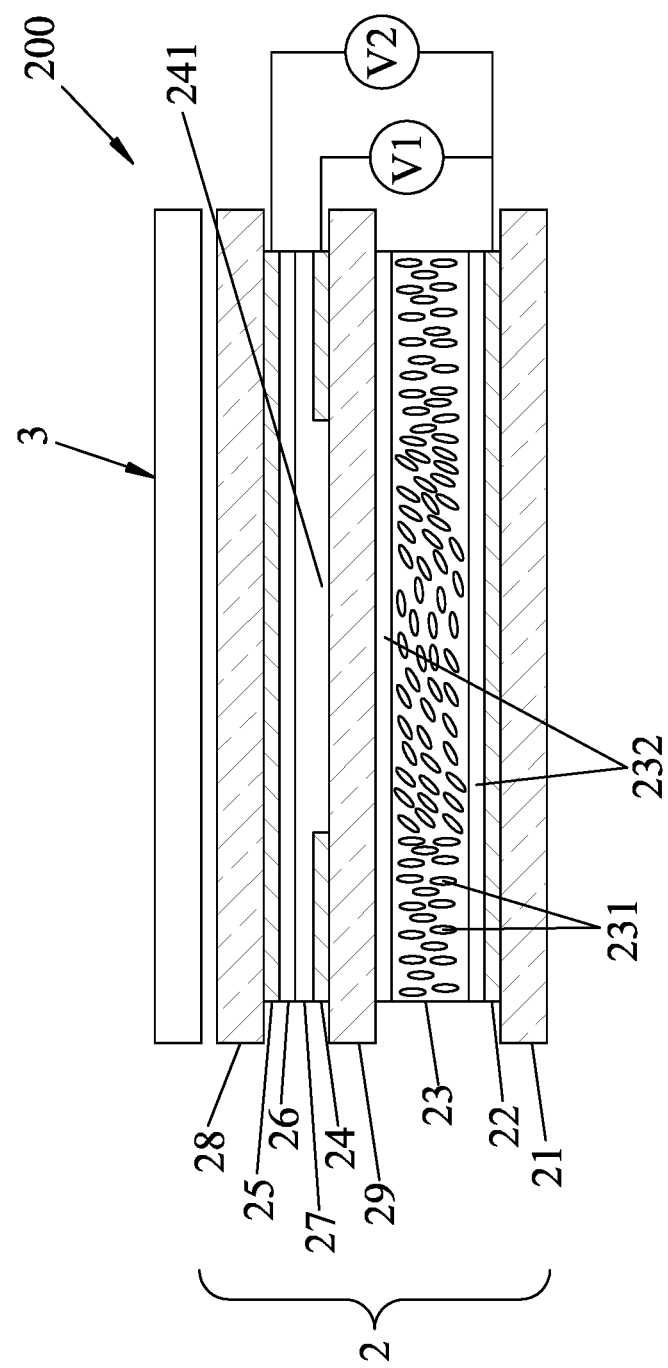
FIG. 4 is a schematic view of a variation of the embodiment of the electrically tunable liquid crystal lens shown in FIG. 1.

Referring to FIG. 4, in a variation of the embodiment of the electrically tunable liquid crystal lens 200, the electrically tunable liquid crystal lens structure 2 of the electrically tunable liquid crystal lens 200 may further include a light-transmissive dielectric substrate 29 disposed between the liquid crystal unit 23 and the patterned electrode layer 24. The dielectric substrate 29 may be made from one of a glass material (for instance, BK7, or H-K9L), and a plastic material (for instance, polycarbonate (PC), poly(methyl methacrylate) (PMMA), E48R, or T62R). In some embodiments, the resistance layer 27 may be disposed in the second position (i.e., between the patterned electrode layer 24 and the dielectric insulating layer 26).

Figure 5A:
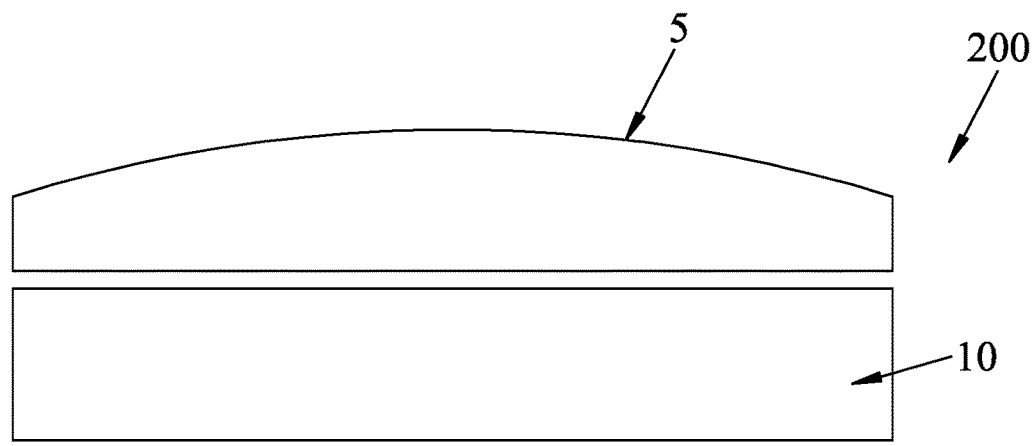
FIG. 5A is a schematic view of another variation of the embodiment of the electrically tunable liquid crystal lens by further including a polarization-independent lens.

Referring to FIGS. 1 and 5A, in another variation of the embodiment of the electrically tunable liquid crystal lens 200, the electrically tunable liquid crystal lens 200 may further include at least one polarization-independent lens 5. The polarization-independent lens 5 may be a concave lens or a convex lens, and may be disposed outboard of the cover 28 or outboard of the carrier substrate 21 of the electrically tunable liquid crystal lens structure 2, such that the electrically tunable liquid crystal lens 200 may be a plano-convex lens, a plano-concave lens, a biconvex lens, a biconcave lens, a concave-convex lens, or a convex-concave lens. In some embodiments, the electrically tunable liquid crystal lens 200, as shown in FIG. 5A, includes an electrically tunable liquid crystal lens element 10 (which may be equivalent to the structures respectively shown in FIG. 1 or 4), and a convex lens serving as the polarization-independent lens 5, such that the electrically tunable liquid crystal lens 200 becomes a plano-convex lens. In some embodiments, a gap may exist between the at least one polarization-independent lens 5 and the liquid crystal lens element 10. In other embodiments, the at least one polarization-independent lens 5 may be directly adhered on the liquid crystal lens element 10.

Figure 5B:
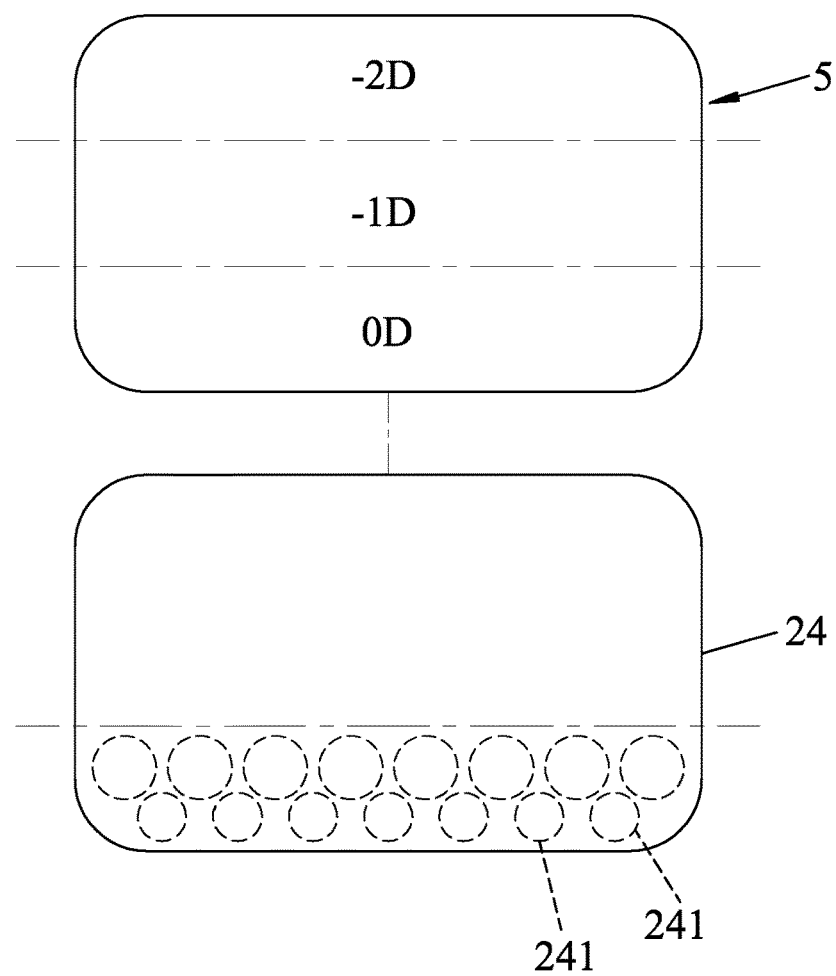
FIG. 5B illustrates top views of the polarization-independent lens and the patterned electrode layer of the electrically tunable liquid crystal lens shown in FIG. 5A.

In certain embodiments, the polarization-independent lens 5 may be a multifocal lens in which the diopters thereof are distributed in positions corresponding to distribution of the aperture patterns 241. In some embodiments, at least one part of the polarization-independent lens 5 is in position corresponding to at least one part of the aperture patterns 241, and thus a diopter of at least one part of the electrically tunable liquid crystal lens 200 (in position corresponding to the at least one part of the polarization-independent lens 5) can be adjusted (through electrically controlled manner as discussed above). FIG. 5B shows schematic top views of the polarization-independent lens 5 and the patterned electrode layer 24. Exemplarily, in some embodiments, the patterned electrode layer 24 is formed with the aperture patterns 241 at a rear part thereof, and thus a rear part of the liquid crystal unit 23 (not shown in FIGS. 5A and 5B) in position corresponding to the aperture patterns 241 has a diopter. In addition, the polarization-independent lens 5 may have different distribution of diopters, for instance, a diopter at a rear part of the polarization-independent lens 5 corresponding in position to the aperture patterns 241 is of 0 D. In view of the above, a diopter at a rear part of the electrically tunable liquid crystal lens 200 (corresponding to the aperture patterns 241) is dependent on the rear part of the patterned electrode layer 24 (i.e., the aperture patterns 241) and the rear part of the liquid crystal unit 23. With reference to FIG. 5B, the patterned electrode layer 24 is formed free of any of the aperture patterns 241 at a middle part or a front part thereof, while a middle part and a front part of the polarization-independent lens 5 are respectively in positions corresponding to the middle and front parts of the patterned electrode layer 24 and respectively have a diopter of −1 D and −2 D. As such, diopters of the middle part and the front part of the electrically tunable liquid crystal lens 200 (respectively in positions corresponding to the middle part and the front part of the patterned electrode layer 24 which are free of aperture patterns 241) are dependent on the middle part and the front part of the polarization-independent lens 5. Through cooperation between the distribution of the aperture patterns 241 and the polarization-independent lens 5, the electrically tunable liquid crystal lens 200 may become an electrically tunable multifocal lens, an electrically tunable progressive lens, or an electrically tunable progressive addition lens. It should be noted that distribution of diopters in the polarization-independent lens 5, and distributions of the aperture patterns 241 described above are merely an exemplary example, and are not limited thereto.

A plurality of the aforementioned electrically tunable liquid crystal lens 200 may be stacked on one another to form a composite electrically tunable liquid crystal lens 300.

Figure 6:
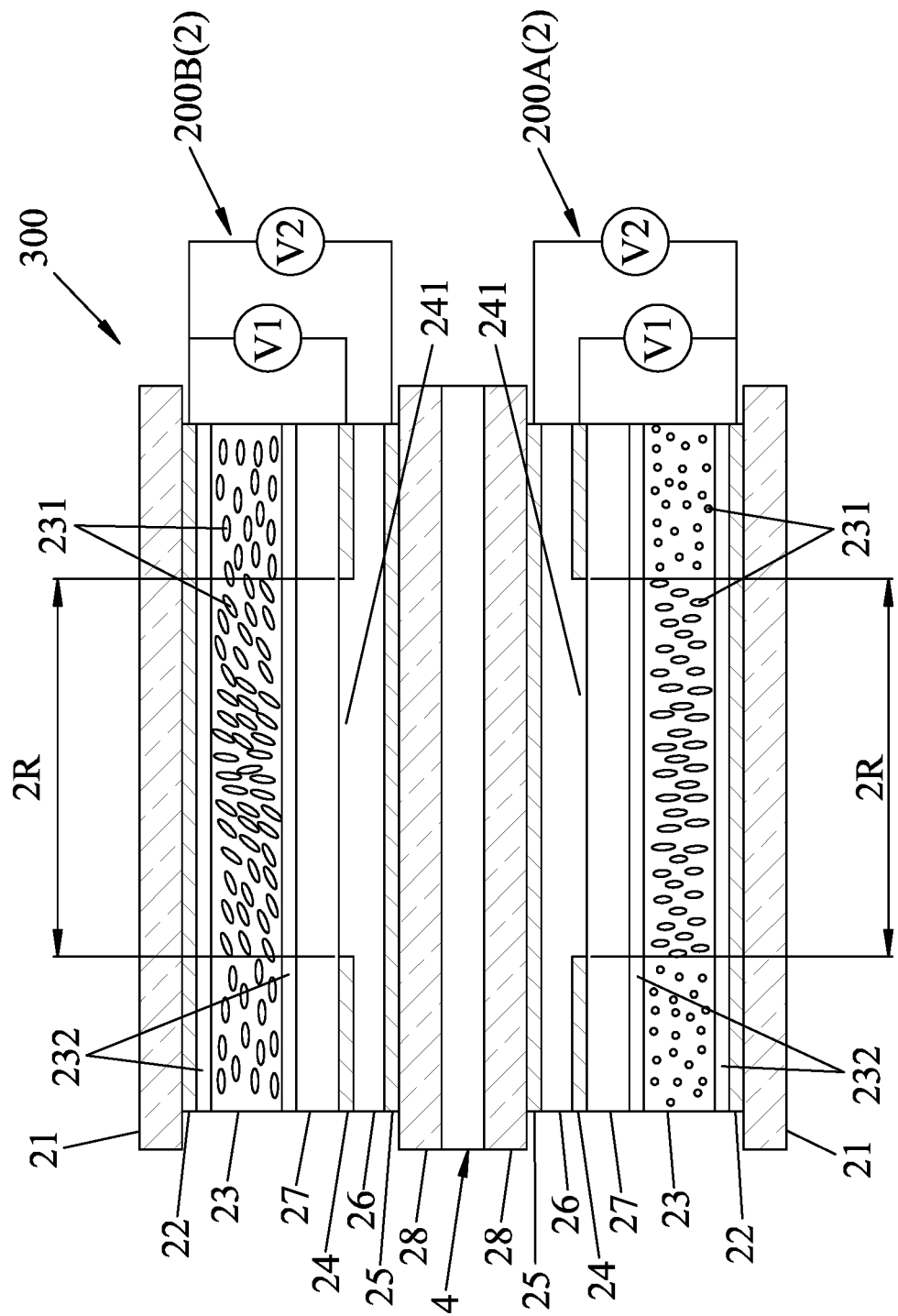
FIG. 6 is a schematic cross-sectional view illustrating an embodiment of a composite electrically tunable liquid crystal lens according to the present disclosure.
Figure 7:
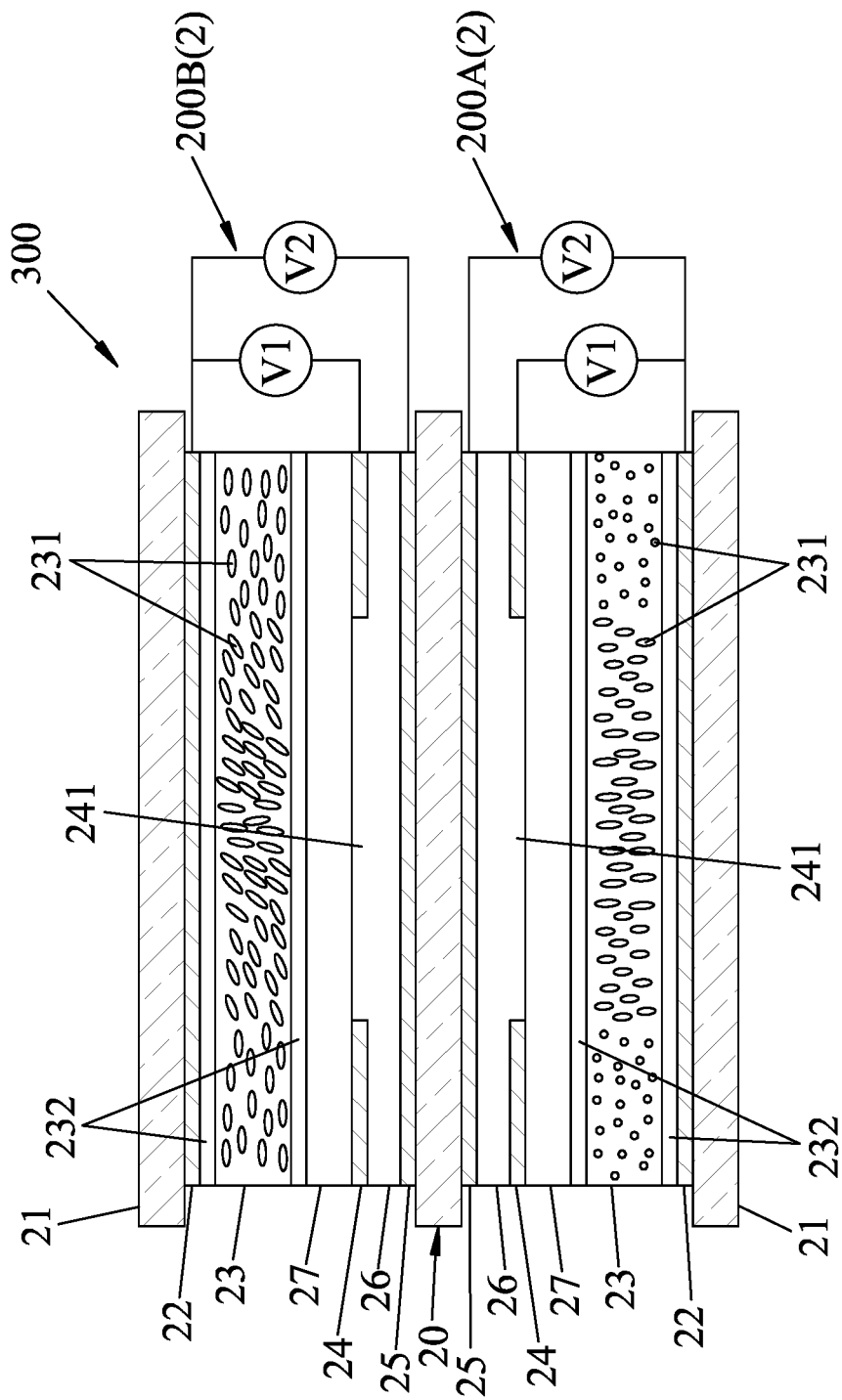
FIG. 7 is a schematic cross-sectional view illustrating a variation of the embodiment of the composite electrically tunable liquid crystal lens shown in FIG. 6.

FIGS. 6 and 7 respectively show an embodiment of the composite electrically tunable liquid crystal lens 300, and a variation thereof. The composite electrically tunable liquid crystal lens 300 includes two electrically tunable liquid crystal lenses 200A, 200B, each of which may be similar to the electrically tunable liquid crystal lens 200 shown in FIG. 1 but excluding the polarizer 3 (i.e., each of the electrically tunable liquid crystal lenses 200A, 200B shown in FIGS. 6 and 7 is equivalent to the electrically tunable liquid crystal lens structure 2 shown in FIG. 1). The first and second electrically tunable liquid crystal lenses 200A, 200B may be connected in a manner that one of the cover 28 and the carrier substrate 21 of a first one of the electrically tunable liquid crystal lenses (hereinafter referred to as "first electrically tunable liquid crystal lens 200A") faces one of the cover 28 and the carrier substrate 21 of the second one of the electrically tunable liquid crystal lenses (hereinafter referred to as second electrically tunable liquid crystal lens 200B). As shown in FIG. 6, in some embodiments, the first and second electrically tunable liquid crystal lenses 200A, 200B are connected to each other in a manner that the cover 28 of the first electrically tunable liquid crystal lenses 200A faces toward the cover 28 of the second electrically tunable liquid crystal lenses 200B. For the composite electrically tunable liquid crystal lens 300 shown in FIG. 6, the covers 28 of the first and second electrically tunable liquid crystal lenses 200A, 200B are connected to each other using an optical adhesive 4 (e.g., optically clear adhesive (OCA)). For the composite electrically tunable liquid crystal lens 300 shown in FIG. 7, the covers 28 (but are not limited thereto) together form an integrally-formed substrate 20, such that the composite electrically tunable liquid crystal lens 300 may form a sandwich structure. As shown in FIGS. 6 and 7, only one aperture pattern 241 is shown in each of the first and second electrically tunable liquid crystal lenses 200A, 200B. However, in practice, there may be a plurality of the aperture patterns 241 in each of the first and second electrically tunable liquid crystal lenses 200A, 200B.

It should be noted that in other embodiments, the cover 28 of the first electrically tunable liquid crystal lens 200A may face toward and connected to the carrier substrate 21 of the second electrically tunable liquid crystal lens 200B, or vice versa. In yet other embodiments, the first and second electrically tunable liquid crystal lenses 200A, 200B may also be connected to each other in a manner that the carrier substrate 21 of the first electrically tunable liquid crystal lens 200A faces toward the carrier substrate 21 of the second electrically tunable liquid crystal lens 200B and is not limited to the aforementioned connection.

Figure 8:
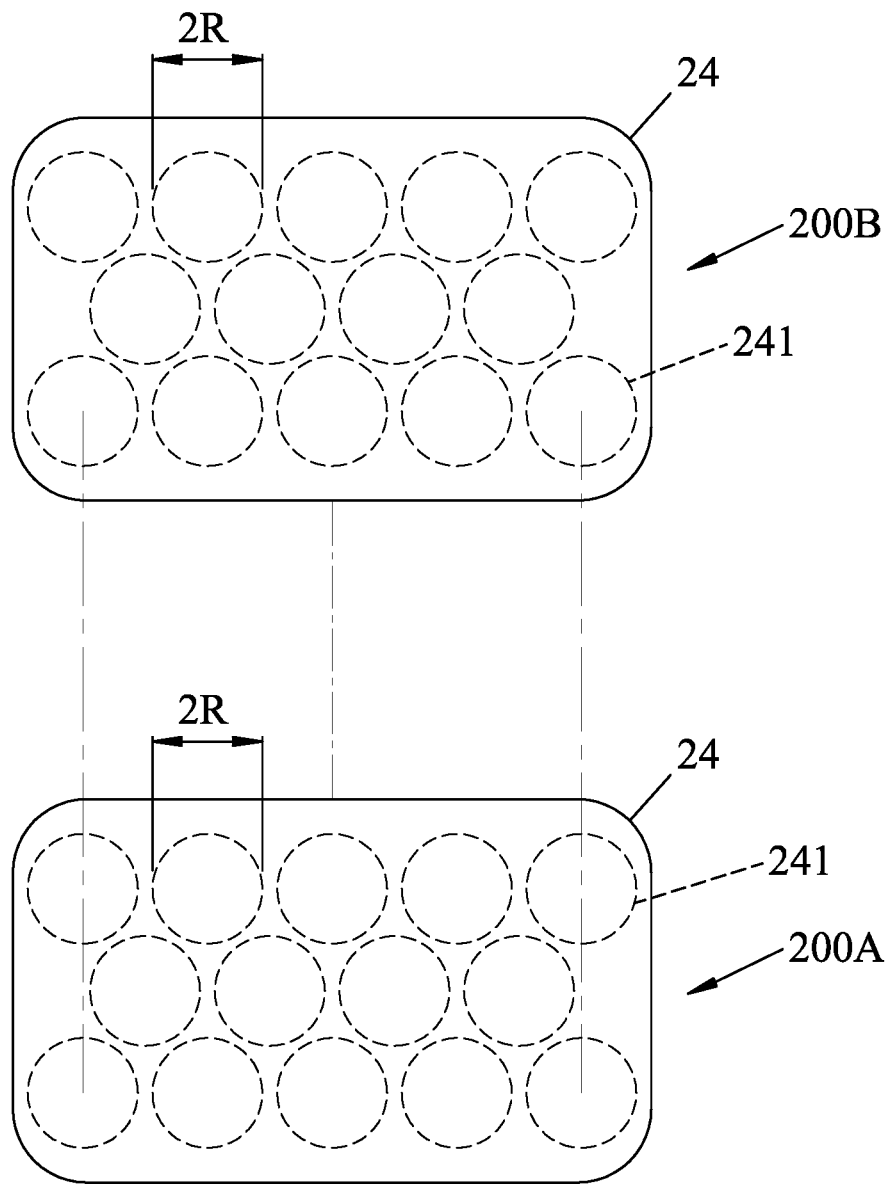
FIG. 8 illustrates schematic top views of the patterned electrode layers of the composite electrically tunable liquid crystal lens shown in FIG. 6.

Referring to FIG. 8, in some embodiments, the number of the aperture patterns 241 formed in the patterned electrode layer 24 of the first electrically tunable liquid crystal lens 200A is the same as that of the second electrically tunable liquid crystal lens 200B. Each of the aperture patterns 241 of the first electrically tunable liquid crystal lens 200A corresponds to a respective one of the aperture patterns 241 of the second electrically tunable liquid crystal lens 200B in position to share the same geometric center. In some embodiments, each of the aperture patterns 241 of the first electrically tunable liquid crystal lens 200A and the respective one of the aperture patterns 241 of the second electrically tunable liquid crystal lens 200B are formed with the same shape and the same size, and the liquid crystal molecules 231 of the first electrically tunable liquid crystal lens 200A are arranged substantially orthogonal to the liquid crystal molecules 231 of the second electrically tunable liquid crystal lens 200B when no electrical power is applied to each of the first and second electrically tunable liquid crystal lenses 200A, 200B. Please note that in the case that an electrical power is applied, as shown in FIG. 6, some of the liquid crystal molecules 231 of the first electrically tunable liquid crystal lens 200A are not orthogonal to the liquid crystal molecules 231 of the second electrically tunable liquid crystal lens 200B. When no electrical power is applied to each of the first and second electrically tunable liquid crystal lenses 200A, 200B, the liquid crystal molecules 231 in one of the regions of the liquid crystal unit 23 in the first electrically tunable liquid crystal lens 200A are substantially orthogonal to the liquid crystal molecules 231 of a corresponding one of the regions of the liquid crystal unit 23 in the second electrically tunable liquid crystal lens 200B. As such, each of the regions of the liquid crystal unit 23 of the first electrically tunable liquid crystal lens 200A is arranged to have a diopter the same as that of a corresponding one of the regions of the liquid crystal unit 23 of the second electrically tunable liquid crystal lens 200B, and the composite electrically tunable liquid crystal lens 300 may be considered as a polarization-independent lens element. When a light passes through such composite electrically tunable liquid crystal lens 300, polarization direction of the light remains unaffected, and thus, such composite electrically tunable liquid crystal lens 300 may be formed free of the polarizer 3.

Figure 9:
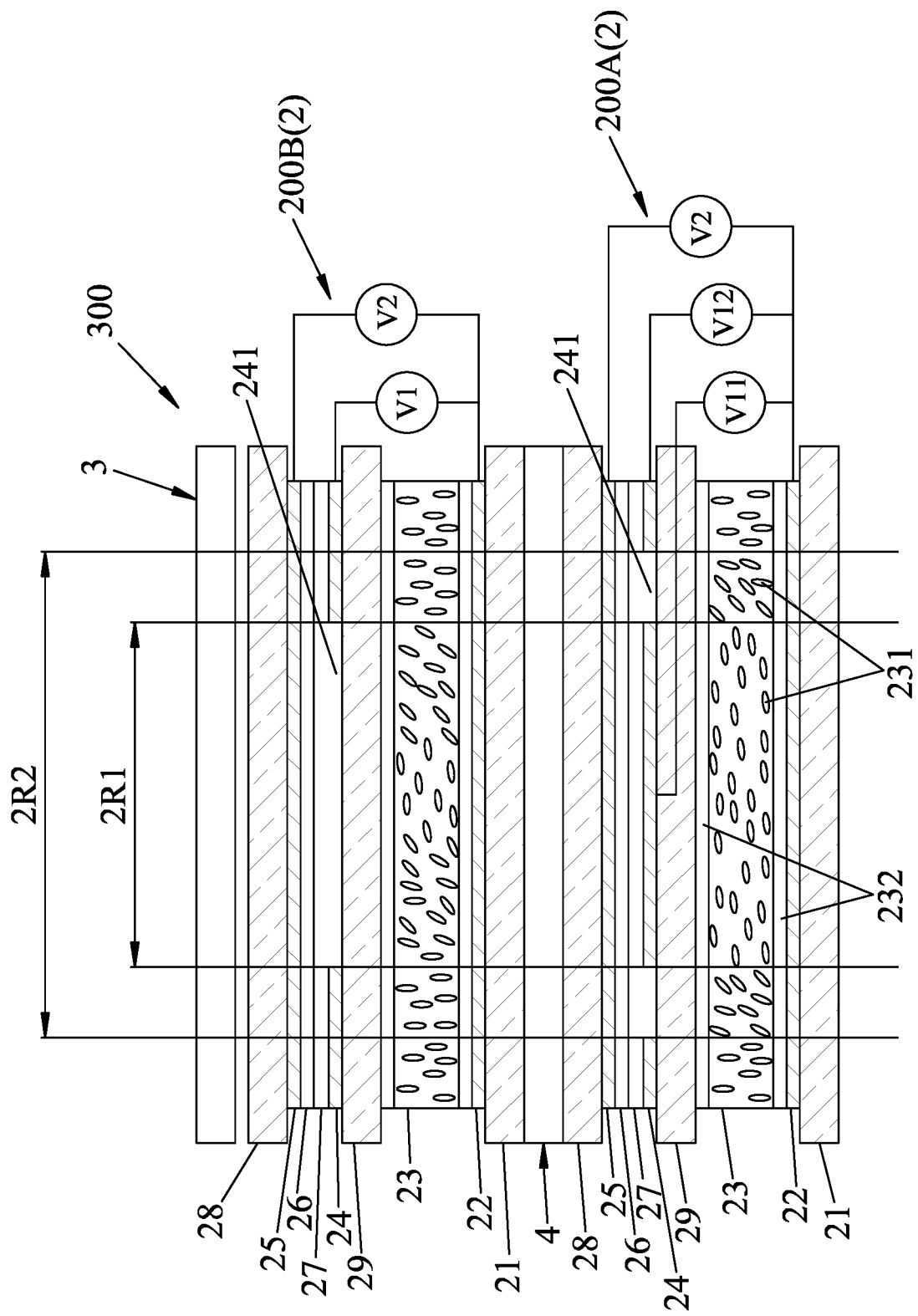
FIG. 9 is a schematic cross-sectional view illustrating another variation of the embodiment of the composite electrically tunable liquid crystal lens according to the present disclosure.
Figure 10:
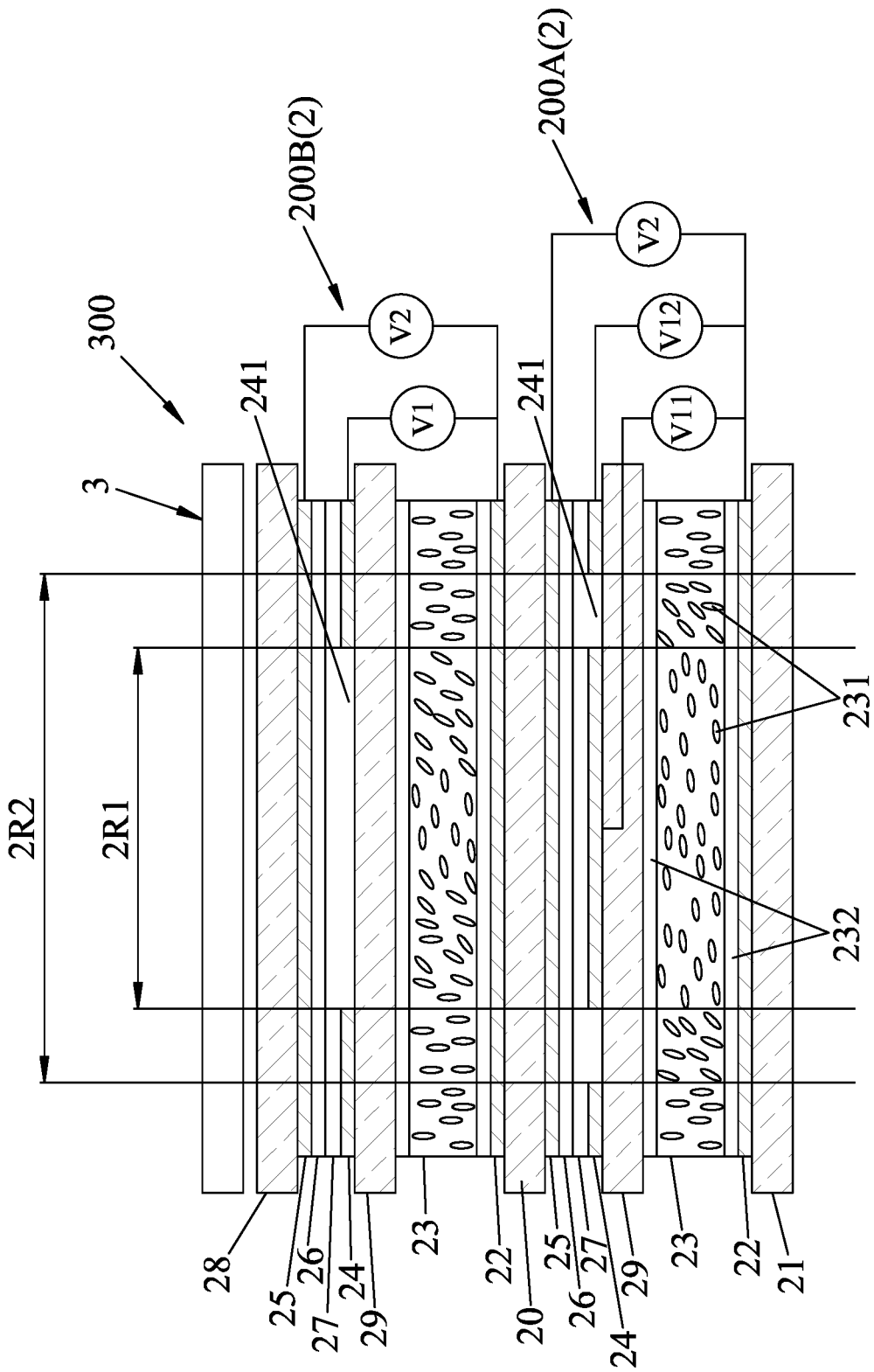
FIG. 10 is a schematic cross sectional view illustrating some other variation of the embodiment of the composite electrically tunable liquid crystal lens shown in FIG. 9.

FIGS. 9 and 10 respectively show two variations of the composite electrically tunable liquid crystal lens 300 in accordance with some embodiments. The composite electrically tunable liquid crystal lens 300 includes two electrically tunable liquid crystal lenses 200A, 200B, each of which may be similar to the electrically tunable liquid crystal lens 200 shown in FIG. 4. For instance, a first one of the electrically tunable liquid crystal lenses (hereinafter referred to as "first electrically tunable liquid crystal lens 200A) is equivalent to the electrically tunable liquid crystal lens structure 2 shown in FIG. 4; and a second one of the electrically tunable liquid crystal lenses (hereinafter referred to as "second electrically tunable liquid crystal lens 200B) is equivalent to the electrically tunable liquid crystal lens 200 shown in FIG. 4 which includes the electrically tunable liquid crystal lens structure 2 and the polarizer 3. In other words, the composite electrically tunable liquid crystal lens 300 may include two of the electrically tunable liquid crystal lens structures 2 shown in FIG. 4, and the polarizer 3. In accordance with some embodiments, as shown in FIG. 9, the cover 28 of the first electrically tunable liquid crystal lens 200A is connected to the carrier substrate 21 of the second electrically tunable liquid crystal lens 200B using an optical adhesive 4 (such as an optical clear adhesive (OCA)). In other embodiments, as shown in FIG. 10, the cover 28 of the first electrically tunable liquid crystal lens 200A and the carrier substrate 21 of the second electrically tunable liquid crystal lens 200B together form the integrally-formed substrate 20, such that the composite electrically tunable liquid crystal lens 300 may form a sandwich structure. The polarizer 3 may be disposed on the first electrically tunable liquid crystal lens 200A opposite to the second electrically tunable liquid crystal lens 200B, or vice versa. Exemplarily, in each of the structures shown in FIGS. 9 and 10, the polarizer 3 is disposed outboard of the cover 28 of the second electrically tunable liquid crystal lens 200B, but is not limited thereto. As shown in FIGS. 9 and 10, only one aperture pattern 241 is shown in each of the first and second electrically tunable liquid crystal lenses 200A, 200B. However, in practice, there may be a plurality of the aperture patterns 241 in each of the first and second electrically tunable liquid crystal lenses 200A, 200B.

It should be noted that in other embodiments, the covers 28 of the first and second electrically tunable liquid crystal lenses 200A, 200B may be connected to each other. In yet other embodiments, the carrier substrate 21 of each of the first and second the electrically tunable liquid crystal lenses 200A, 200B may be connected to each other. The first and second electrically tunable liquid crystal lenses 200A, 200B may be connected to each other in other manner, and is not limited to the aforementioned connection.

Figure 11:
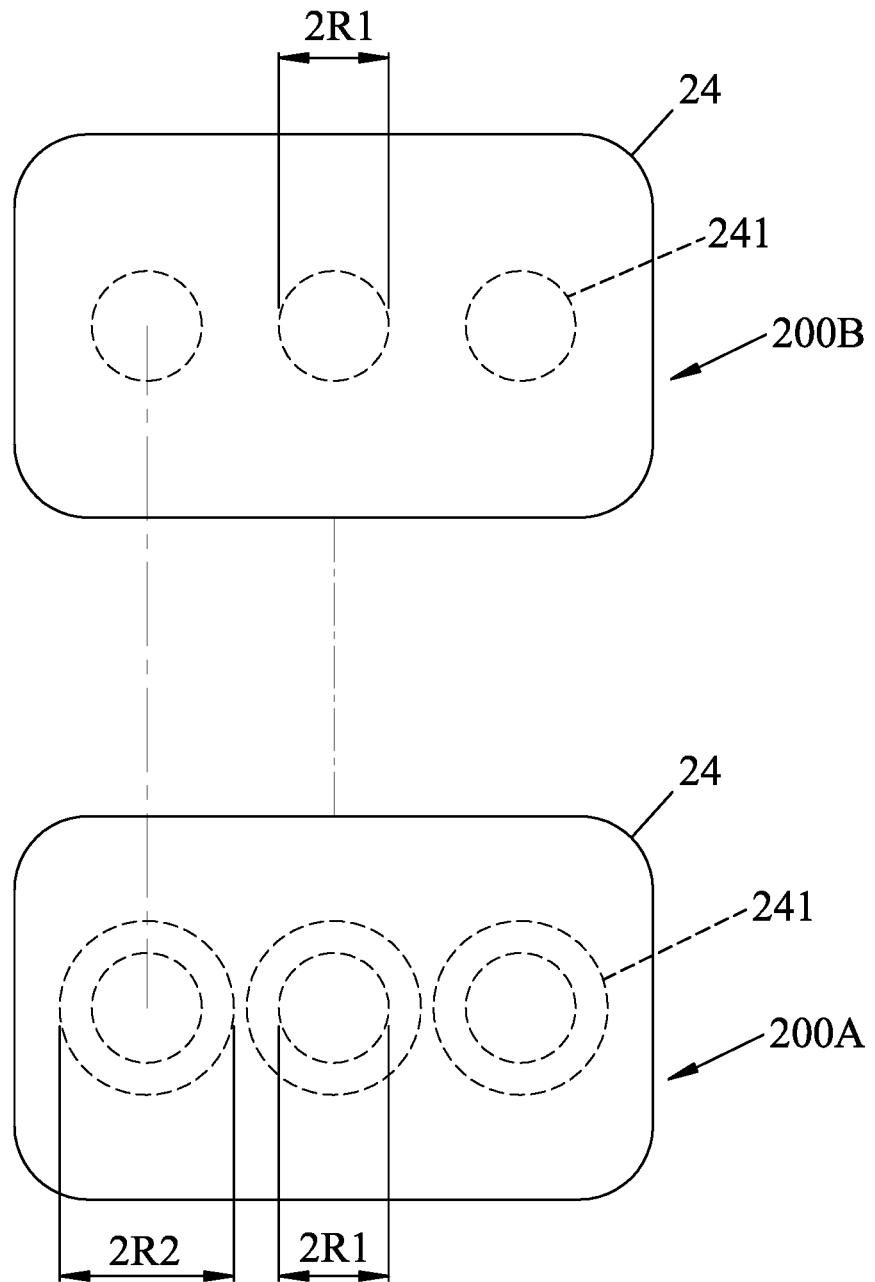
FIG. 11 illustrates schematic top views of the patterned electrode layers of the composite electrically tunable liquid crystal lens shown in FIG. 9.

Referring to FIG. 11, in some embodiments, the aperture patterns 241 of the second electrically tunable liquid crystal lens 200B may each be formed with a circle shape having a radius of R1, and the aperture patterns 241 of the first electrically tunable liquid crystal lens 200A may each be formed with a ring shape having an external radius of R2. In addition, a diameter (2R1) of each of the circle-shaped aperture patterns 241 of the second electrically tunable liquid crystal lens 200B is not greater than an inner diameter of each of the ring-shaped aperture patterns 241 of the first electrically tunable liquid crystal lens 200A. Moreover, a projection of each of the circle-shaped aperture patterns 241 on the patterned electrode layer 24 of the first electrically tunable liquid crystal lens 200A is located within an interior portion of a respective one of the ring-shaped aperture patterns 241, and is surrounded by the respective ring-shaped aperture pattern 241 (i.e., the projection of each of the circle-shaped aperture patterns 241 does not overlap with the respective ring-shaped aperture pattern 241). Each of the circle-shaped aperture patterns 241 and the respective ring-shaped aperture pattern 241 cooperatively form a respective composite aperture pattern (not shown) which is in a circle shape and which has a radius dependent on the external radius R2 of the respective ring-shaped aperture pattern 241. Such composite aperture pattern may achieve the effect of a larger size aperture pattern. It should be noted that, in comparison with a conventional electrically tunable liquid crystal lens having a single one aperture pattern, each of the electrically tunable liquid crystal lenses 200A, 200B having a plurality of aperture patterns may have a larger adjustable range of refractive index (diopter). In addition, in comparison with an electrically tunable liquid crystal lens having a plurality of aperture patterns each having a radius of R2, the composite electrically tunable liquid crystal lens 300 having the composite aperture patterns (each having the same radius of R2) may be arranged to obtain an even larger diopter value and may have a larger adjustable range of reflective index (diopter).

Specifically, the patterned electrode layer 24 of the first electrically tunable liquid crystal lens 200A is connected to an external electric source for applying voltage respectively to the interior portion and an exterior portion of each of the ring-shaped aperture patterns 241, such that the patterned electrode layer 24 cooperates with the common electrode layer 22 to respectively build an interior voltage V11 and an exterior voltage V12 over a corresponding one of the regions of the liquid crystal unit 23. For each of the regions of the liquid crystal unit 23 in position corresponding to the respective composite aperture pattern, the liquid crystal molecules 231 accordingly rotate into different orientation, and thus provides the effect that regions of the composite electrically tunable liquid crystal lens 300 each in position corresponding to the respective composite aperture pattern has a relatively larger size. In addition, by virtue of the interior voltage V11, the exterior voltage V12, the second voltage V2 of the first electrically tunable liquid crystal lens 200A, and the first and second voltages V1, V2 of the second electrically tunable liquid crystal lens 200B, each of the regions of the composite electrically tunable liquid crystal lens 300 that is in position corresponding to the respective composite aperture pattern has a gradual and continuous change of diopter in accordance with a gradual and continuous change of refractive indices of the corresponding region of the liquid crystal units 23 of each of the first and second electrically tunable liquid crystal lenses 200A, 200B.

To conclude, the electrically tunable liquid crystal lens 200 of the present disclosure includes the patterned electrode layer 24 formed with a plurality of the aperture patterns 241. When the liquid crystal unit 23 is subjected to the predetermined variable electric field, and the liquid crystal molecules 231 rotate to alter refractive index of the liquid crystal unit 23, resulting in the regions of the liquid crystal unit 23 in positions corresponding to the aperture patterns 241 each has a diopter. The aperture patterns 241 are distributed in positions corresponding to the entire lens area of the electrically tunable liquid crystal lens 200, such that the entire lens area may have an adjustable diopter. In addition, since the aperture patterns 241 may be formed with a relatively small size, the regions of the liquid crystal unit 23 may have a diopter of a relatively large value, thereby a relatively wide range of diopter may be achieved. Moreover, the composite electrically tunable liquid crystal lens 300 of the present disclosure includes two the aforementioned first and second electrically tunable liquid crystal lenses 200A, 200B, each of which includes the respective liquid crystal unit 23 subjected to the predetermined variable electric field. As such, the first and second electrically tunable liquid crystal lenses 200A, 200B may cooperatively form a polarization independent lens, or may achieve the effect of large aperture patterns.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electrically tunable liquid crystal lens, comprising:
a carrier substrate that is light-transmissible;
a common electrode layer disposed on said carrier substrate;
a liquid crystal unit disposed on said common electrode layer opposite to said carrier substrate, and including a plurality of liquid crystal molecules;
a patterned electrode layer disposed on said liquid crystal unit opposite to said common electrode layer, and having a plurality of aperture patterns, said aperture patterns being located within a projection of said liquid crystal unit on said patterned electrode layer;
a terminal electrode layer disposed on said patterned electrode layer opposite to said liquid crystal unit;
a dielectric insulating layer disposed between said patterned electrode layer and said terminal electrode layer to electrically isolate said patterned electrode layer and said terminal electrode layer from each other;
a cover disposed on said terminal electrode layer opposite to said dielectric insulating layer, said cover being light-transmissible,
wherein said aperture patterns are spaced apart from each other, and
wherein said aperture patterns at different regions are formed with different sizes or different shapes to thereby allow the different regions to have different diopters.

2. The electrically tunable liquid crystal lens as claimed in claim 1, further comprising a polarizer disposed outboard of one of said cover and said carrier substrate.

3. The electrically tunable liquid crystal lens as claimed in claim 1, further comprising a resistance layer disposed on one of a first position between said liquid crystal unit and said patterned electrode layer, and a second position between said dielectric insulating layer and said patterned electrode layer, said resistance layer having a resistivity greater than that of said patterned electrode layer and lower than that of said dielectric insulating layer.

4. The electrically tunable liquid crystal lens as claimed in claim 1, wherein said liquid crystal unit further includes two alignment membranes, one of which is disposed between said common electrode layer and said liquid crystal molecules, and the other one of which is disposed on said liquid crystal molecules opposite to said common electrode layer.

5. The electrically tunable liquid crystal lens as claimed in claim 1, wherein said aperture patterns at said different regions are formed with the different sizes, and said different regions are arranged along a predetermined direction based on gradual change in the sizes of said aperture patterns at said different regions.

6. The electrically tunable liquid crystal lens as claimed in claim 1, wherein said aperture patterns are arranged in one of an irregular manner and a regular manner.

7. A composite electrically tunable liquid crystal lens, comprising two electrically tunable liquid crystal lenses as claimed in claim 1 which are connected to each other in a manner that one of said cover and said carrier substrate of a first one of said electrically tunable liquid crystal lenses faces one of said cover and said carrier substrate of a second one of said electrically tunable liquid crystal lenses, each of said aperture patterns of said first one of said electrically tunable liquid crystal lenses corresponding to a respective one of said aperture patterns of said second one of said electrically tunable liquid crystal lenses in position to share the same geometric center.

8. The composite electrically tunable liquid crystal lens as claimed in claim 7, further comprising a polarizer disposed on said first one of said electrically tunable liquid crystal lenses opposite to said second one of said electrically tunable liquid crystal lenses.

9. The composite electrically tunable liquid crystal lens as claimed in claim 7, wherein said one of said cover and said carrier substrate of said first one of said electrically tunable liquid crystal lenses and said one of said cover and said carrier substrate of said second one of said electrically tunable liquid crystal lenses together form an integrally-formed substrate.

10. The composite electrically tunable liquid crystal lens as claimed in claim 7, wherein said cover of said first one of said electrically tunable liquid crystal lenses is connected to said carrier substrate of said second one of said electrically tunable liquid crystal lenses;
said aperture patterns of said first one of said electrically tunable liquid crystal lenses are each formed with a ring shape, and said aperture patterns of said second one of said electrically tunable liquid crystal lenses are each formed with a circle shape; and
a projection of each of said aperture patterns of said second one of said electrically tunable liquid crystal lens on said patterned electrode layer of said first one of said electrically tunable liquid crystal lenses is located within an interior portion of a respective one of said ring-shaped aperture patterns of said first one of said electrically tunable liquid crystal lenses, and is surrounded by said respective ring-shaped aperture pattern.

11. The composite electrically tunable liquid crystal lens as claimed in claim 7, wherein each of said electrically tunable liquid crystal lenses further includes a dielectric substrate disposed between said liquid crystal unit and said patterned electrode layer, and a resistance layer disposed between said patterned electrode layer and said dielectric insulating layer.

12. The composite electrically tunable liquid crystal lens as claimed in claim 7, wherein
said cover of said first one of said electrically tunable liquid crystal lenses is connected to said cover of said second one of said electrically tunable liquid crystal lenses;
each of said aperture patterns of said first one of said electrically tunable liquid crystal lenses and a respective one of said aperture patterns of said second one of said electrically tunable liquid crystal lenses are formed with the same shape and the same size; and
said liquid crystal molecules of said first one of said electrically tunable liquid crystal lenses are arranged orthogonal to said liquid crystal molecules of said second one of said electrically tunable liquid crystal lenses.

* * * * *